S. W. VAUGHT.
WINDMILL ATTACHMENT.
APPLICATION FILED AUG. 23, 1912.
1,076,251.
Patented Oct. 21, 1913.
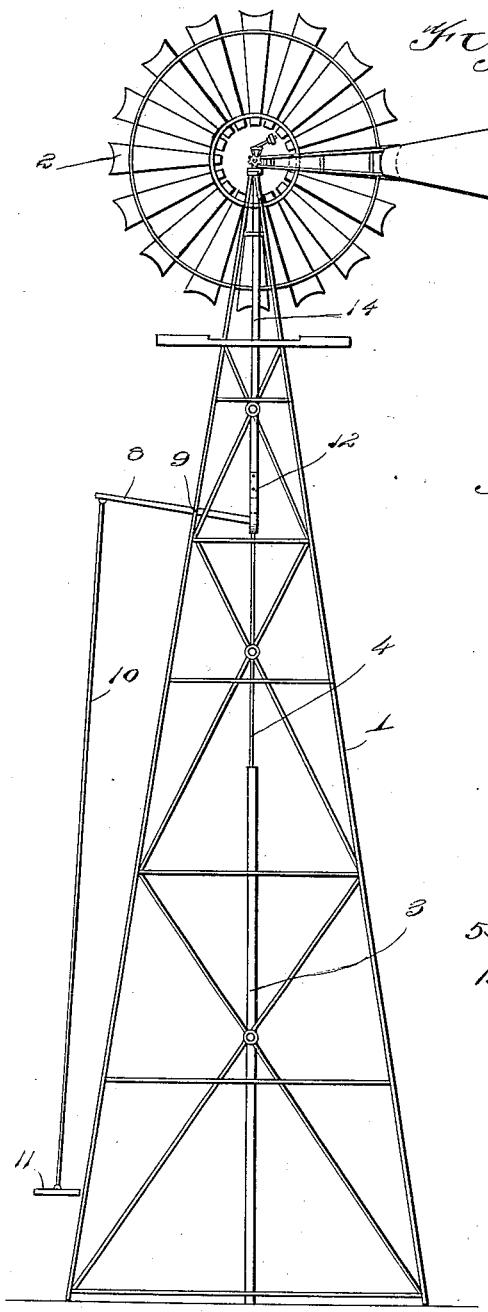
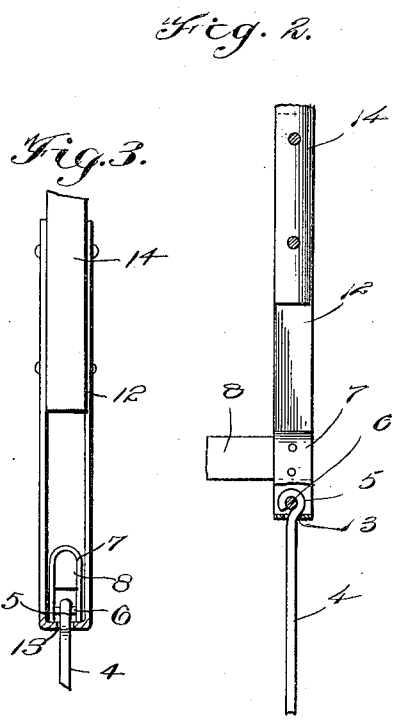
Witnesses
Inventor
S. W. Vaught.
By Victor J. Evans
Attorney

UNITED STATES PATENT OFFICE.

SILAS W. VAUGHT, OF GORMAN, TEXAS.

WINDMILL ATTACHMENT.

1,076,251. Specification of Letters Patent. Patented Oct. 21, 1913.

Application filed August 23, 1912. Serial No. 716,674.

*To all whom it may concern:*

Be it known that I, SILAS W. VAUGHT, a citizen of the United States, residing at Gorman, in the county of Eastland and State of Texas, have invented new and useful Improvements in Windmill Attachments, of which the following is a specification.

The present invention relates to improvements in wind mills.

In carrying out the invention I propose to provide the plunger rod of a wind mill with simple and effective means whereby the pump may be operated when the wheel is thrown out of the wind, or when there is not sufficient wind for rotating the wheel. I also aim to provide a device of this class which shall embody a lever that is pivoted to the frame of the wind mill, and that has a weighted end which is connected with the pump rod, a flexible element provided with a handle which is arranged in close proximity to the ground, and within easy reach of the operator whereby the lever may be swung to operate the pump, the pump rod passing through an opening formed in a substantially U-shaped saddle that is of a sufficient length to permit of the oscillatory movement of the lever without interfering with the rod extension which is attached to the said saddle, and which in turn is connected with the wheel of the mill.

It is a further purpose of the invention to provide a hand operating device for the pump of a wind mill which will automatically impart a down stroke to the sucker rod and which, when the said rod is not operated manually, will materially assist the wind mill in operating the sucker rod in one direction.

With the above recited objects in view, and others which will appear as the nature of the invention is more fully understood the improvement resides in the construction, combination and operative arrangement of parts set forth in the following specification, and falling within the scope of the appended claim.

In the drawing, Figure 1 is a view of a wind mill provided with my attachment. Fig. 2 is a detail sectional view of the same.

Referring now to the drawing in detail, the numeral 1 designates the wind mill frame, which may be of any ordinary construction, and which supports the fan wheel 2 of the mill.

The numeral 3 designates the pump of the mill, and 4 the piston or sucker rod which operates within the pump. The rod 4, in the present instance has its upper extremity formed with an eye 5 through which passes a suitable pintle 6 whereby the said rod is pivotally connected between the opposite sides of a yoke 7. The yoke 7 is in turn connected with a lever 8, the said lever being pivotally secured to the frame 1 as designated by the numeral 9. The inner extremity of the lever, or that portion provided with the yoke and connected with the rod 4 is weighted sufficiently to impart automatically a down stroke to the rod 4, while connected with the outer end of the lever 8 is a flexible member 10, the lower extremity of which is provided with a handle 11. The handle 11 is arranged adjacent the ground upon which the mill is erected, and is consequently in a convenient position to be gripped by a person desiring to operate the sucker rod 4, through the medium of the lever 9.

The numeral 12 designates a substantially U-shaped member or saddle, the connecting member of which is formed with an opening 13 through which passes the rod 4. The opposite arms of the said saddle are connected with a pump rod extension 14, the same in turn being connected with the pitman of the wheel shaft, and adapted to be oscillated when the wheel is revolved. The saddle 12 is of a sufficient length to freely permit of the movement of the lever 9 without causing the said lever to contact therewith, so it will be readily noted that the pump 3 may be operated either by the lever or by the wheel.

From the above description, taken in connection with the accompanying drawing, the simplicity of the device, as well as the advantages thereof, will, it is thought be perfectly apparent to those skilled in the art to which such inventions appertain without further detailed description.

Having thus described the invention, what I claim is:—

In combination with a wind mill and a frame for the mill, a pump provided with a sucker rod and a piston rod connected with the crank of the wind wheel that is independent of the sucker rod, of a substantially U-shaped saddle having its side arms connected with the rod of the wind wheel, said saddle having its lower member provided with an opening through which passes the end of the sucker rod, the said projecting end of the sucker rod being provided with an eye, a lever pivotally connected with the frame of the wheel, a yoke secured to one end of the lever and arranged between the arms of the saddle, said yoke having its depending side arms connected by a pivot, said pivot passing through the eye of the rod, and a flexible member connected with the free end of the lever.

In testimony whereof I affix my signature in presence of two witnesses.

SILAS W. VAUGHT.

Witnesses:
J. W. CAMP,
GEORGE VAUGHT.

Copies of this patent may be obtained for five cents each, by addressing the "Commissioner of Patents, Washington, D. C."